United States Patent
Sørensen

(10) Patent No.: US 9,392,350 B2
(45) Date of Patent: Jul. 12, 2016

(54) AUDIO COMMUNICATION SYSTEM WITH MERGING AND DEMERGING COMMUNICATIONS ZONES

(71) Applicant: GN Store Nord A/S, Ballerup (DK)

(72) Inventor: Peter Schou Sørensen, Valby (DK)

(73) Assignee: GN Store Nord A/S (DK)

( * ) Notice: Subject to any disclaimer, the term of this patent is extended or adjusted under 35 U.S.C. 154(b) by 37 days.

(21) Appl. No.: 14/566,653

(22) Filed: Dec. 10, 2014

(65) Prior Publication Data

US 2015/0304758 A1 Oct. 22, 2015

(30) Foreign Application Priority Data

Dec. 20, 2013 (EP) .................................... 13198872

(51) Int. Cl.
| | |
|---|---|
| H04R 1/10 | (2006.01) |
| H04R 5/033 | (2006.01) |
| H04R 27/00 | (2006.01) |
| H04R 5/04 | (2006.01) |
| H04S 7/00 | (2006.01) |
| H04M 1/60 | (2006.01) |

(52) U.S. Cl.
CPC .............. *H04R 1/1041* (2013.01); *H04R 5/033* (2013.01); *H04R 5/04* (2013.01); *H04R 27/00* (2013.01); *H04S 7/304* (2013.01); *H04M 1/6066* (2013.01); *H04R 1/1083* (2013.01); *H04R 2201/107* (2013.01); *H04R 2420/07* (2013.01); *H04R 2460/01* (2013.01); *H04R 2460/07* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 2006/0203183 A1* | 9/2006 | Jannard | H04R 1/1066 351/41 |
| 2006/0287748 A1 | 12/2006 | Layton et al. | |
| 2008/0008342 A1 | 1/2008 | Sauk | |
| 2008/0317263 A1* | 12/2008 | Villarreal, Jr. | A42B 3/30 381/120 |

OTHER PUBLICATIONS

Paul Sauk et al; "Creating a Multi-Dimensional Communication Space to Improve the Effectiveness of 3-D Audio", Military Communication Conference, 2007, MILCOM 2007. IEEE, IEEE, Piscataway, NJ, USA, Oct. 29, 2007, pp. 1-7, XP031232723, ISBN: 978-1-4244-1512-0.

* cited by examiner

*Primary Examiner* — Muhammad N Edun
(74) *Attorney, Agent, or Firm* — Altera Law Group, LLC

(57) ABSTRACT

An audio communication system configured to be head worn by a user and with at least one communication zone configured to communicate with the at least one other audio communication system through a communications channel that can be open or closed. The audio communication system may comprise at least one audio unit configured to sound an acoustic scene to a user using the audio communication system and which acoustic scene is enabled for inclusion of at least one voice from at least one another audio communication system. The audio communication system may further comprise at least one microphone configured to receive a voice from a user using the audio communication system. There is a field of view in the direction of orientation of the audio communications system.

18 Claims, 14 Drawing Sheets

AUDIO COMMUNICATION SYSTEM WITH MERGING AND DEMERGING COMMUNICATIONS ZONES

FIELD OF INVENTION

This invention relates to an audio communication system configured to be head worn by a user and with at least one communication zone configured to communicate with the at least one other audio communication system through a communications channel that can be open or closed. The audio communication system may comprise at least one audio unit configured to sound an acoustic scene to a user using the audio communication system and which acoustic scene is enabled for inclusion of at least one voice from at least one another audio communication system. The audio communication system may further comprise at least one microphone configured to receive a voice from a user using the audio communication system. There is a field of view in the direction of orientation of the audio communications system.

BACKGROUND OF THE INVENTION

Multi way audio communication can be difficult, or at least, problematical. Such communications are often subject to various forms of environmental and operational interference and disruption, such as deafening sounds from machinery, people and/or nature. This is particularly true where elements from the communication system being used are secured within the confines of or upon the structure of a head gear, such as a headband or a neckband. Such a type of a head gear is commonly used within industries involving high noise conditions (i.e. deafening sounds), such as aircraft industry, gaming industry and construction industry.

According to prior art WO 00/13462, an audio communication system implemented into a wearable helmet comprising a noise cancellation filter for eliminating noise being transferred through speakers and into the user's ear, a microphone for communicating with another audio communication system, and a radio communication unit processing the communication between the two audio communication systems.

It is a disadvantage that the audio communication system is not able to selectively communicate with different other audio communication system(s).

It is a further disadvantage that the audio communication system is not able to communicate with more than one audio communication system.

It is an additionally disadvantage that the audio communication system is not capable of rendering the other audio communication systems into an acoustic scene.

It is a further disadvantage that the audio communication system is uncomfortable to handle.

SUMMARY

An object of the invention is achieved by an audio communication system configured to be head worn by a user and with at least one communication zone configured to communicate with the at least one other audio communication system through a communications channel that can be open or closed. The audio communication system may comprise at least one audio unit configured to sound an acoustic scene to a user using the audio communication system and which acoustic scene is enabled for inclusion of at least one voice from at least one another audio communication system. The audio communication system may further comprise at least one microphone configured to receive a voice from a user using the audio communication system. There is a field of view in the direction of orientation of the audio communications system.

The audio communication system may furthermore be configured to establish an open communication channel when a predetermined opening handle is effectuated as a function of the field of view and to connect the one communication zone with at least one other communication zone of another audio communication system for establishing a common communication zone for communication between the least two audio communication systems via an open communication channel. Furthermore, the audio communication system is configured to remain connected to said least one common communication zone until a predetermined closing handle is effectuated to disconnect from the at least one common communication zone. Thus, the audio communication system overcomes problems of the prior art by a user handling the audio communication system 1 in its intended operational position, and wherein the audio communication system 1 is configured to a predetermined opening handle which may be effectuated as a function of the field of view. The opening handle then connects the one communication zone with at least one other communication zone of another audio communication system for establishing a common communication zone. In the common communication zone the at least two audio communication systems may communicate via an open communication channel.

An effect thereof is to provide the user of the audio communication system the ability to communicate with at least one other user with another audio communication system in a noisy environment and with an improved audibility of the communication.

A further effect thereof is to provide the user of the audio communication system the skills to selectively communicate with different other users of audio communication systems by moving the field of view of the user in any environment.

An opening handle may be understood as an event, a series of events, means for opening or likewise technical means that when present or fulfilled or when effectuated or activated will connect one communication zone with another communication system. An action such as pressing a button may cause two communications zones to connect. In this sense, an opening handle being effected may cause two communications zones to connect. Thus a predetermined opening handle being effectuated may cause the happening of two communications zones to connect when the predetermined conditions are present or become present. As such a predetermined opening handle being effectuated, by the presence and/or the execution of the predetermined conditions, may cause two communication zones to connect. In one sense a feature of the present opening handle is that the communication system is prepared or enabled for connection as disclosed.

Likewise the closing handle may be understood in a similar way.

For an orientation there is understood to be a field of view. In one limit the field of view is simply the orientation as a vector, but generally the field of view will correspond to a field of view spanning a certain angle about the orientation. The field of view may be angle such as about 45 degrees when operating in an environment where the attention is similar to the human view. The angle may be smaller when operating in an environment with focus and the angle may be larger when operating in an environment with a broadened perception.

An additional effect thereof is to provide the user of the audio communication system an easier way of establishing a communication with another user of another audio communication system, e.g. in a noisy environment and an environment requiring low volume conversations, such as whispering.

The effects of the present invention has the advantage over the prior art to provide the user the ability of performing a communication with one or more other user, separately or simultaneously, in a preferred environment without being forced to move away from the preferred environment. A further advantage is to provide the at least two users an enhanced understanding of the communication since the object or point of interest is in the view of the at least two users. The object or point of interest could be a position or an object which may be an essential part of the discussion (i.e. communication) between the at least two users.

The effects of the present invention has a further advantage over the prior art which is to provide the ability to the user of choosing a communication between plurality of users of other respective audio communication systems. This enhances the flexibility and the usability of the audio communication system in communicating with different users of the respective audio communication systems.

The audio unit may comprise at least one speaker, a headband or a neckband. In an alternative embodiment the audio unit may comprise at least one microphone.

The field of view may be a virtual view of the audio communication system being a function of a current position of the user and/or an orientation of the audio communication system.

The communication zone may be a virtually and a predetermined area surrounding the user.

The communication channel may be a communication path between at least two users.

According to an embodiment of the invention the least one communication zone is configured to merge with at least one other communication zone. A merger is a process by which the acoustic scenes of the at least two communication zones is united in a single acoustic scene enclosed by the common communication zone.

The merging of at least two communication zones may be comparable to merging of at least two bubbles wherein the shape of the two bubbles forms into a common shape denoted as the common communication zone.

A user, a first user, a second user, a third user and another user may be configured to an audio communication system, respectively.

According to an embodiment of the invention the at least one communication zone is configured to demerge from at least one other communication zone or at least one audio communication system already part of the communications zone.

A demerger is a process by the acoustic scene of the common communication zone is split or diverted into at least two acoustic scenes enclosed by the respective communication zones.

The demerging of at least two communication zones may again be comparable to demerging of at least two bubbles wherein the common bubble is pulled from each other forming two bubbles which attain the same shape as before the merging process.

For each opening handle there may be a complementary closing handle. Generally there may for each action, event, or function that may effectuate or open the opening handle there may be an corresponding action, event, or function that may effectuate or close the closing handle. In embodiments the opening handle and closing handle may be opposite or negations of each other. Such opposites or negations may be "approaching" vs. "departing", head "Nodding" vs. head "shaking", "left" vs. "right", etc.

According to an embodiment of the invention the audio communications system has an acoustic renderer configured to acoustically render an acoustic scene, which acoustic scene rendered preferably is a function of a head related transfer function.

The acoustic renderer may acoustically render an acoustic scene into a 3D sound world representing the real life sound environment surrounding the user of the audio communication system, where noise signals may be filtered out. The advantage of the acoustic renderer is that the user is moving in a 3D sound world listening to audio sounds and voices undisturbed by noise sounds, and thereby, the audio communication system improves the user's ability to orientate in any kind of an environment.

According to an embodiment of the invention the audio communication system is configured to render an acoustic scene encompassing each and everyone of the audio communications systems in the least one common communication zone.

The acoustic scene may comprise at least one 3D sound configured to the voice of at least one other user configured to another audio communication system. The voice of the at least one other user may be spatially interrelated to at least one current position of the at least one other user.

The advantage of the acoustic scene renderer is to give the user the possibility to communicate with a group of other users and orientate field of view towards the other user speaking. Thereby, the users experience a real life communication where the user/users are able to orientate according to the voice of a user speaking.

According to an embodiment of the invention the audio communications system is configured to overlay at least one audio signal from an audio source such as a radio, an alert signal, a phone, an instructor speaker.

During a conversation between two users of respective audio communication systems an audio signal of a phone call, an alarm, a calling system, and/or an information system maybe effectuated forcing to disconnect, interrupt or overlay the conversation with the audio signal. The audio communication system improves the usability of the audio communication system together with other external objects. Furthermore, the audio communication system improves the safety of using a head wearable audio unit.

According to an embodiment of the invention the audio communication system comprises a geographical position unit configured to estimate a current position of the audio communication system.

In one or more embodiments the geographical position unit may comprise a global positioning system (GPS) unit for receiving a satellite signal for determining and/or providing the geographical position of the audio unit. Throughout the present disclosure, the term GPS-unit is used to designate a receiver of satellite signals of any satellite navigation system that provides location and time information anywhere on or near the Earth, such as the satellite navigation system maintained by the United States government and freely accessible to anyone with a GPS receiver and typically designated "the GPS-system", the Russian GLObal NAvigation Satellite System (GLONASS), the European Union Galileo navigation system, the Chinese Compass navigation system, the Indian Regional Navigational Satellite System, etc, and also including augmented GPS, such as StarFire, Omnistar, the Indian GPS Aided Geo Augmented Navigation (GAGAN), the European Geostationary Navigation Overlay Service (EGNOS), the Japanese Multifunctional Satellite Augmentation System (MSAS), etc.

In one or more embodiments the geographical position unit is a WiFi-network with different stations or fix points and means for determining a position by triangulation or geometrical functions alike.

The user moving around in the environment will experience a spatially interrelation between the audio unit and the plurality of users equipped with respective audio communication systems and at least one audio signal.

According to an embodiment of the invention the audio communication system comprises an orientation unit configured for estimating a current orientation of the audio communication system, and in particular of a user when the user handles the audio communications system in its intended operational position.

The orientation unit may include a gyroscope, an accelerometer and/or an electronic compass.

The user moving around in the environment would experience an improved spatially interrelation between the audio unit and the plurality of users configured to respective audio communication systems and at least one audio signal.

According to an embodiment of the invention the audio communication system is configured to render an acoustic scene as a function of the current position and/or orientation of the audio communication system and/or as a function of the current position and/or orientation of at least one other audio communication system.

The user is able to merge or demerge between one or more another users by orientating the audio communication system and/or by moving the audio communication system in one direction.

According to an embodiment of the invention the opening handle is effectuated when a first field of view of a first audio communication system is at least partially overlapping a second field of view of a second communications system when the fields of views are oriented essentially towards one and another.

According to an embodiment of the invention the opening handle is effectuated when a first opening distance of a first audio communication system is within a second opening distance of a second audio communication system, a communications zone or a common communication zone.

In a particular embodiment, the opening distance different from a closing distance, whereby dithering is limited or avoided. In a preferred embodiment, the opening distance is shorter than the closing distance.

The opening distance is denoted as an opening distance radius $R_F$. The opening distance radius $R_F$ is defined as being the radius having its origin configured to a central point of the user's head, also denoted as being a current position of the user of the audio communication system. The opening distance radius $R_F$ may be defined within a range, such as 1 m to 500 m, 1 m to 250 m, 1 m to 100 m, 1 m to 50 m, 10 m 100 m and 1 m to 10 m.

The closing distance may be denoted as a closing distance radius $R_C$ which is defined in the same way as the opening distance radius. The closing distance radius $R_C$ may be defined within a range, such as $0.5 \times R_F$ to $R_F$, $0.002 \times R_F$ to $0.05 \times R_F$, $0.002 \times R_F$ to $0.95 \times R_F$ and $0.1 \times R_F$ to $0.5\ R_F$.

If a current position of another user is within the opening distance configured to the user of the audio communication system the opening handle is effectuated. Then if the current position of the other user is not within the closing distance and/or outside the opening distance the closing handle is effectuated.

According to an embodiment of the invention the opening handle is effectuated when the first audio communication system is approaching a second audio communication system, a communications zone or a common communication zone.

The advantage of effectuating the opening handle based on approaching a second user is that the first user is able to orientate randomly in all directions during activation of the opening handle. This improves the usability of the audio communication system, and furthermore, the audio communication system may also be safe to wear.

According to an embodiment of the invention the opening handle is effectuated when the audio communication system is oriented towards a predefined location or Point-of-interest predefined to connect to a common communication zone.

The advantage of effectuating the opening handle by orienting the audio communication system towards a location or a Point-of-Interest, is that a plurality of users are able to effectuate the opening handle establishing a common communication zone comprising the plurality of users. A further advantage is that at least two may establish a common communication zone without looking and moving towards each other.

According to an embodiment of the invention the closing handle is effectuated when the audio communication system is oriented towards a predefined location or Point-of-Interest to disconnect from a common communication zone.

According to an embodiment of the invention the closing handle is effectuated as a function of at least the current position, changed current position, orientation or changed orientation.

According to an embodiment of the invention the communications amongst plurality of audio communication systems is performed via a shared server.

Alternatively, the shared server could be a public network system, smart phone system, internal network system or any kind of a network system.

According to an embodiment of the invention the rendering of an acoustic scene is performed on a shared server.

The advantage of performing the rendering of the acoustic scene on a shared server is that the size and cost of the audio communication system is reduced.

A further advantage is that the speed of performing the rendering of the acoustic scene is increased.

According to an embodiment of the invention the audio communication system is configured with a noise cancellation system to make an essentially noise free communication zone or common communication zone.

A person skilled in the art will be able to choose amongst different noise cancellation systems and one such system being disclosed in US 2005/0276421. A noise cancellation system may be of passive or of active type.

The advantage of configuring the audio communication system with a noise cancellation system is to improve the communication between two users configured to the respective audio communication systems.

The noise cancellation system is able to shift between multiple modes, such as a mute mode, an active mode, passive mode, and a custom mode.

In the mute mode the noise cancellation system is able to cancel every sound in the surrounding environments.

In the active mode the noise cancellation system is able to cancel or eliminate noise signals from one or more surrounding environments of at least one or more users, respectively.

In the active mode the noise cancellation system is able to cancel or eliminate noise signals from one surrounding environment of at least one user.

In the passive mode the noise cancellation system is effectuated, and thereby, no cancelling of noise signals or any kind of an audio signal is performed.

According to an embodiment of the invention the audio communication system is configured with means for at least temporally to exclude activation of the opening handle.

Another objective is achieved by an audio communications system as disclosed and where the opening handle is effectuated to connect the one communication zone with acoustic scene for establishing a common communication zone for communication via an open communication channel.

The audio communication system may be configured to remain connected to said least one common communication zone until a predetermined closing handle is effectuated to disconnect from the least one common communication zone.

If a second user is placed outside visibility of a first user, the first user is able to connect with the second user by calling over a phone or any kind of an external communication device. Then, if the second user accepts the phone call or communication handle, an acoustic scene, configured to the second user, is included into the communication zone configured to the first user. Thereby, the acoustic scene and the communication zone form a common communication zone.

BRIEF DESCRIPTION OF DRAWINGS

Embodiments of the invention will be described in the figures, whereon.

| Detailed Description | |
|---|---|
| Item | No |
| audio communication system | 1 |
| Other audio communication system | 1X |
| First audio communication system | 1A |
| Second audio communication system | 1B |
| Third audio communication system | 1C |
| User | 2 |
| First user | 2A |
| Second user | 2B |
| Third user | 2C |
| Communication zone | 3 |
| Other communication zone | 3X |
| First communication zone | 3A |
| Second communication zone | 3B |
| Communication/Communicate | 4 |
| Communications channel | 5 |
| Open communication channel | 6 |
| Close communication channel | 7 |
| Audio unit | 8 |
| Acoustic scene | 9 |
| Voice | 10 |
| Second voice | 10B |
| Microphone | 11 |
| Field of view | 12 |
| First field of view | 12A |
| Second field of view | 12B |
| Third field of view | 12C |
| Orientation | 13 |
| Opening handle | 14 |
| Closing handle | 15 |
| Noise cancellation filter | 16 |
| Orientation unit | 18 |
| Position unit | 19 |
| Common communication zone | 20 |
| Noise source | 21 |
| Noise sound | 22 |
| Wanted sound | 23 |
| Audio source | 24 |
| Audio signal | 25 |
| Current position | 26 |
| First current position | 26A |
| Second current position | 26B |
| Point-of-interest | 27 |
| First point-of-interest | 27A |
| Second point-of-interest | 27B |
| Changed current position | 28 |
| Changed orientation | 29 |
| Shared server | 30 |
| Recognition signal | 31 |
| Master user | 32 |
| Opening distance radius | $R_f$ |
| First opening distance | $D_1$ |
| Second opening distance | $D_2$ |
| Field of view angle span | $\alpha_f$ |
| Closing distance | Dc |
| First closing distance | $D_{c1}$ |
| Second closing distance | $D_{c2}$ |
| Closing distance radius | Rc |

Figure 1:
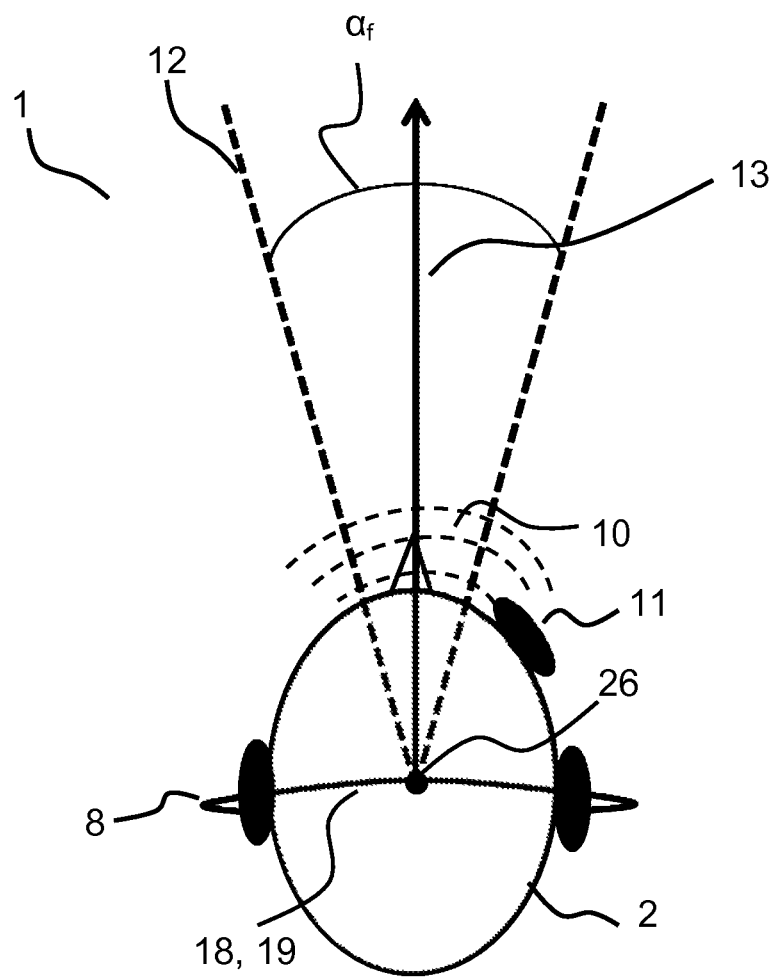
FIG. 1 illustrates an exemplary audio communication system configured to be head worn and with a field of view and an orientation.

FIG. 1 illustrates an exemplary audio communication system 1 configured to be head worn by a user 2. This embodiment of the audio communication system 1 comprises at least one microphone 11, and at least audio unit 8. The audio communication system 1 has at least one field of view 12 in the respective direction of at least one orientation 13. The field of view 12 may be defined within a field of view angle span $α_f$.

In a particular variant of this embodiment, the audio communications system 1 may include at least one orientation unit 18 configured for determining the orientation 13 of the audio communication system 1. In yet another variant the audio communications system 1 may have a position unit 19 for determining the current location 26 of the audio communication system 1.

The orientation unit 18 and or the positioning unit 19 may also be implemented into an external object connected wirelessly or wired to the audio communication system 1, wherein the audio communication system 1 may comprise or may not comprise an orientation unit 18 or the positioning unit 19.

The audio unit 8 may be part a headband, a neckband or any kind of a wearable audio unit. The audio unit 8 may be configured to sound an acoustic scene 9 (not shown in FIG. 1) being a voice 10 or a sound from an unit being a computer, alarm, voice message or any kind of a sound. The microphone 11 may be configured to receive a voice 10 (not shown in FIG. 1) from the user 2 using the audio communication system 1.

The orientation unit 18 may in an embodiment be configured to estimate a current orientation 13 of the user 2 when the user handles the audio communication system 1 in its intended operational position. Likewise the positioning unit 19 may in an embodiment be configured to estimate the current position 26 of the user 2 when the user handles the audio communication system 1 as intended.

The orientation unit 18 determine the orientation as a function of inertia and may comprise at least one gyroscope and/or at least one accelerometer to determine the current orientation of the users 2 head, such as head yaw, head pitch and/or head roll. Alternatively or additionally a compass may be used to determine the orientation 13.

The position unit 19 may be configured to estimate a current position 26 of the audio communication system 1. The position unit 19 may comprise a position antenna and a global position system interface.

In this particular example, the audio communication system 1 comprises a user 2 wearing the audio unit 8 and one microphone 11 wherein the user 2 has an orientation 13 and a field of view 12. Furthermore, the audio communication system 1 comprises the orientation unit 18 estimating the orientation 13 and the position unit 19 estimating the current position 26 of the audio communication system 1.

Figure 2:
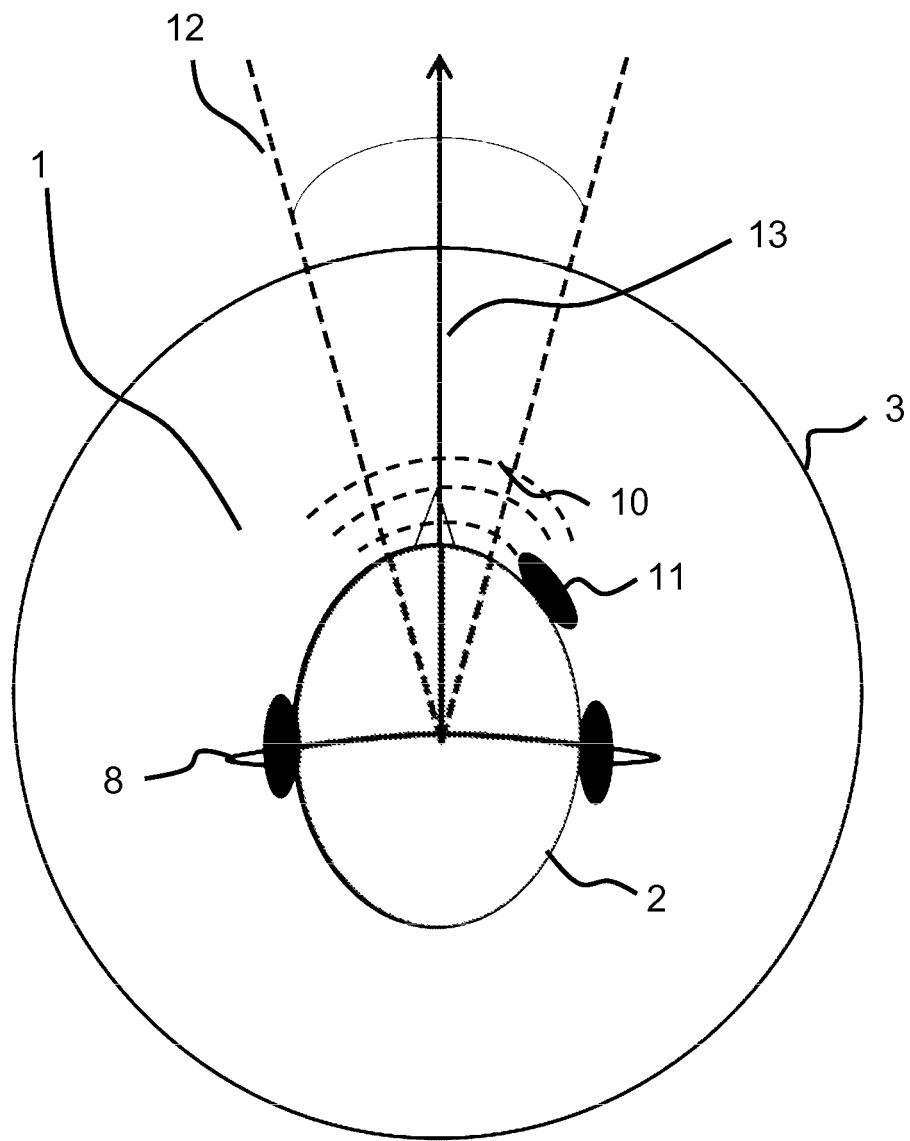
FIG. 2 illustrates an exemplary audio communication system configured to be head worn and with a communication zone, FIG. 3 Illustrates an exemplary audio communication system wherein an acoustic scene comprises two voices and two noise cancellation filters, FIGS. 4A-4C Illustrate an exemplary audio communication system wherein an audio communication system has established and disestablished a common communication zone.

FIG. 2 illustrates in continuation of FIG. 1 an exemplary audio communication system 1 with a communication zone 3 comprising the voice 10 of the user 2 wearing the audio communication system 1.

Figure 3:
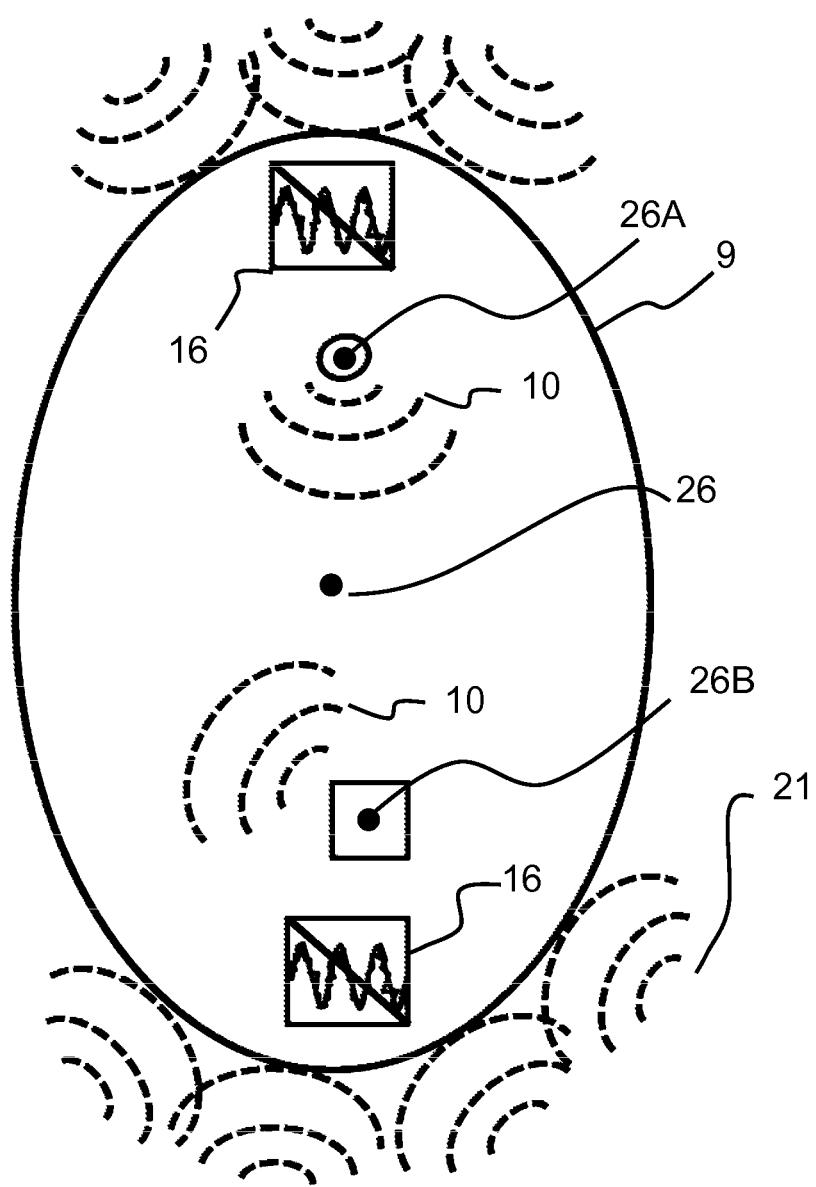

FIG. 3 illustrates an exemplary an acoustic scene 9 as established by an audio communication system 1.

The acoustic scene 9 may comprise at least one voice 10.

The acoustic scene 9 is configured to a current position of the audio communication system 1.

In a particular embodiment the acoustic scene 9 may comprise least one noise cancellation filter 16 configured to filter out noise from an outside. In particular, the noise cancellation filter 16 may cancel noise surrounding the user 2 (not shown). The at least one noise cancellation filter 16 may be configured to eliminate at least one noise sound 22 from at least one noise source 21 to enter the acoustic scene 9.

The at least one voice 10 may represent a sound from an entity, such as an alarm, an electronic voice messenger, a computer, a voice speak from a second user 2B of another audio communication system 1X etc. The at least one voice 10 may be configured to a first current position 26A.

In this particular example, the acoustic scene 9 comprises two voices 10 each sounding a sound representing an entity. Both voices 10 may be configured to a first 26A and a second 26B current position, respectively. The sounds from the surrounding environment to the acoustic scene 9 are eliminated by the two noise cancellation filters 16 forming the acoustic scene 9 into a sound bubble comprising only the sounds from the two voices 10.

The acoustic scene 9 may be established by a head related transfer function (HRTF) and the sources of sounds may be rendered into the acoustic scene 9 by an acoustic renderer, which may be part of the audio communication system 1 or alternatively implemented elsewhere.

FIG. 4 illustrates an exemplary audio communication system 1 wherein at least a first user 2A is wearing an audio communication system 1 and at least a second user 2B is wearing another audio communication system 1X, wherein the audio communication system 1 and another audio communication system 1X comprise a communication zone 3 and another communication zone 3X, respectively. The users 2A and 2B may be in a noisy environment illustrated by a least one noise sound 22 from at least one noise source 21. The noisy environment may be so noisy that the users are unable to hear each other.

Each user may experience a rendered acoustic scene 9, which may be individualised as a first acoustic scene 9A and a second acoustic scene 9B.

Figure 4A:
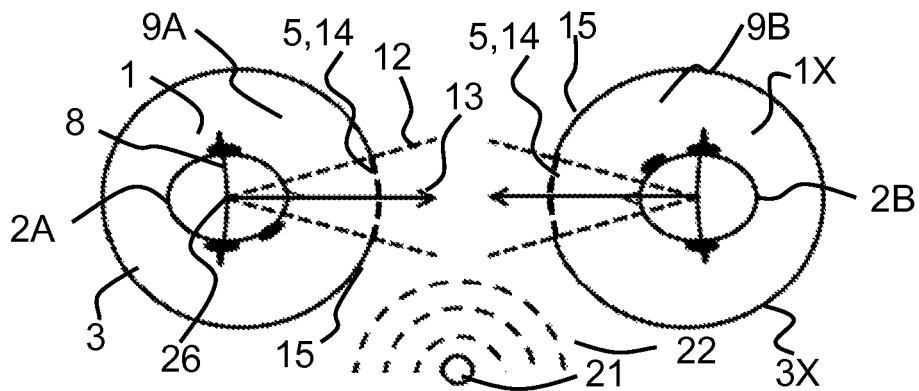

FIG. 4A illustrates the two users (2A,2B) having the respective field of view 12 directed towards each other initializing an opening handle 14 and a communication channel 5 leading to an open communication channel 6. If appropriate, the first and the second user (2A, 2B) may effectuate a closing handle.

In particular, and by no means exclusive example, the surrounding environment of the two users (2A,2B) trying to communicate to each other may be an environment with a noise source 22 comprising a noise sound 22, such as machinery, people, traffic, concerts etc. The noise sound 2 may be characterized as being a deafening sound making it impossible or almost impossible to have a conversation between the two users (2A, 2B). In this particular example the two users (2A, 2B) are not able to hear what the other is saying, since the open communication channel 6 has not been established between the audio communication system 1 and the other audio communication system 1X.

Figure 4B:
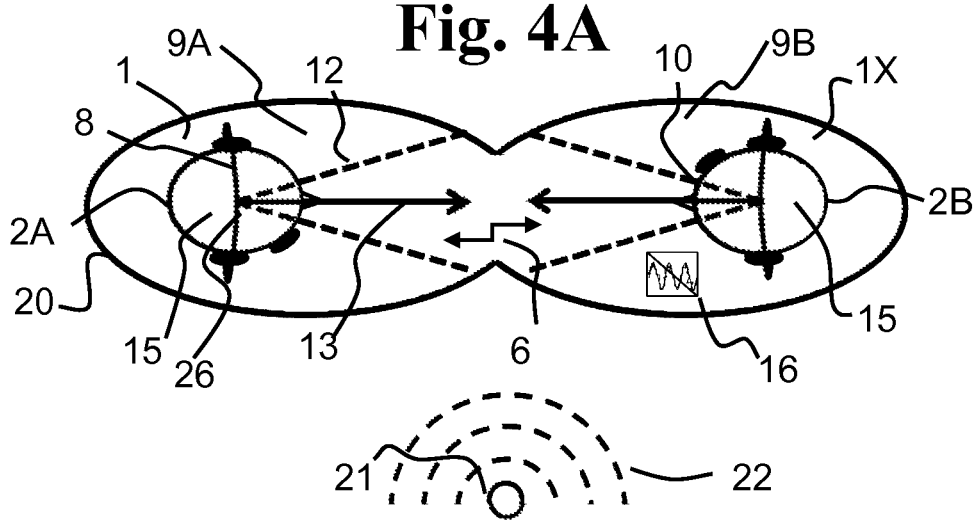

FIG. 4B illustrates the audio communication system 1 wherein at least a first user 2A wearing the audio communication system 1 may effectuate a predetermined opening handle 14 leading to an establishment of an open communication channel 6 between the two audio communication systems (1, 1X). During establishing of the open communication channel 6 a common communication zone 20 may be formed by merging the communication zone 3 and the other communication zone 3X. The least two audio communication systems (1,1X), configured to the common communication zone 20, have the possibility of communicating via the open communication channel 6. The voice 10 of the at least two users (2A,2B) may be merged through the open communication channel 6. Alternatively, the merged voices 10, from the two users (2A, 2B) may be further merged with a second voice (10B) or an audio signal 25. The common communication zone 20 may comprise an acoustic scene 9 including a voice 10 of least one user 2 and/or a noise cancellation filter 16. The noise cancellation filter 16 may be merged with the voice 10 of the at least one user 2.

Hence the common communication zone 2 may be established by merging at least two communication zones (3, 3X).

At least the audio communication system 1 has an acoustic rendered configured to acoustically render the acoustic scene 9, wherein the acoustic scene 9 rendered preferably is a function of a head related transfer function (HRTF). The HRTF may be configured to merge and render a 3D sound acoustic scene through an audio unit 8 and into the at least one ear of at least the first user 2A.

Furthermore, the acoustic renderer may be configured to render the acoustic scene 9 as a function of the current position 26 and/or orientation 13 of the audio communication system 1 and/or as a function of the current position 26 and/or orientation 13 of at least one other audio communication system 1X.

The opening handle 14 may be effectuated by at least the first user 2A having the field of view 12 directed towards at least a second user 2B wearing another audio communication system 1X. By effectuating the opening handle 14 may lead to a merging of at least two communication zones (3, 3X). Alternatively, the opening handle 14 may be effectuated by at least the first user having the field of view 12 directed towards a predetermined object.

Alternatively, the opening handle 14 may be effectuated by at least the first user 2A having the field of view 12 oriented 13 towards a predetermined direction. The orientation 13 may be fixed within a certain direction or location for time interval, say of 1 to 10 seconds.

In this particular example, the opening handle 14 is effectuated by at least the first user 2A having the field of view 12 oriented 13 towards at least the second user 2B wearing another audio communication system 1X. This results in the establishment of the common communication zone 20 and in continuation of previous example, the two users (2A, 2B) now have a common communication zone 20 wherein the two users (2A, 2B) are able to communicate by the respective audio communication systems (1,1X) unperturbed through the open communication channel 6. If appropriate, the first and the second user (2A, 2B) may effectuate a closing handle 15 which may lead to a demerging of the common communication zone 20 into at least two communication zones (3, 3X).

In the noisy environment without the noise sound 22 from the noise source 21, such as machinery, people, traffic, concerts etc the established common communication zone 20 may be essentially noise free. The rendered acoustic scene 9 comprises 3 dimensional (3D) sound characterized by overlaying or rendering the voices 10 of the two users (2A, 2B), wherein the overlaid or rendered voices 10 may be configured to a current position of the respective users (i.e. voice of the first 2A and the second 2B user). Furthermore, the rendered acoustic scene 9 comprises a noise cancellation filter 16 preventing any kind of noise source 21 to enter the rendered acoustic scene 9.

The rendered acoustic information may be a 3 dimensional (3D) sound, wherein the rendered acoustic information may include a sound adapted to a geographical position, wherein the sound may be dependent on a distance value and an orientation value to the geographical position.

Figure 4C:
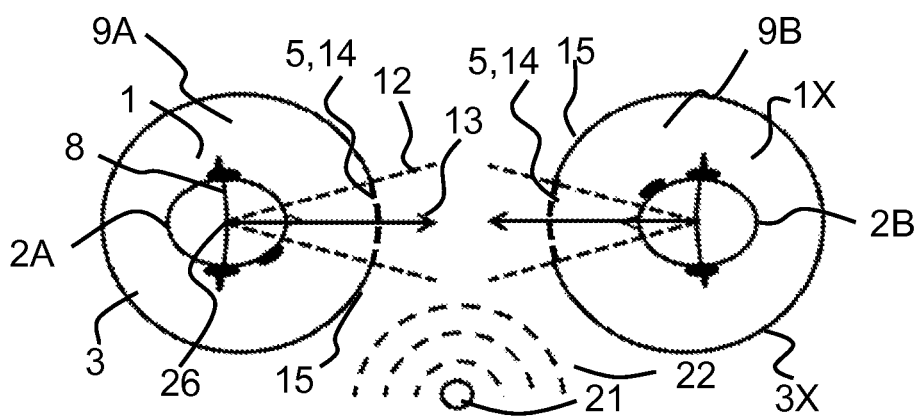

FIG. 4C illustrates the audio communication system 1 wherein at least the first user 2A wearing the audio communication system 1 may effectuate a predetermined closing handle 15 leading to a demerger or splitting of the least one common communication zone 20. This will result in audio communication system 1 and the communication zone 3 being separated from the other communication zone 3X.

The closing handle 15 may be effectuated by at least the first user 2A by pressing a stop, demerger, eject or separate button (not shown in the figure) on the audio unit 8. Alternatively, the closing handle 15 may be effectuated by at least the first user 2A having the field of view 12 oriented 13 away from at least the second user 2B wearing another audio communication system 1X. In yet another alternative, the closing handle 15 may be effectuated by at least the first user 2A having the field of view 12 oriented 13 towards a predetermined direction and keeping the direction within a direction time interval; say of 1 to 10 seconds.

In this particular example, the closing handle 15 is effectuated by at least the first user 2A by pressing a demerge button (not shown in the figure) on the audio unit 8. If appropriate, the first and the second user (2A, 2B) may effectuate an opening handle 14.

Figure 5:
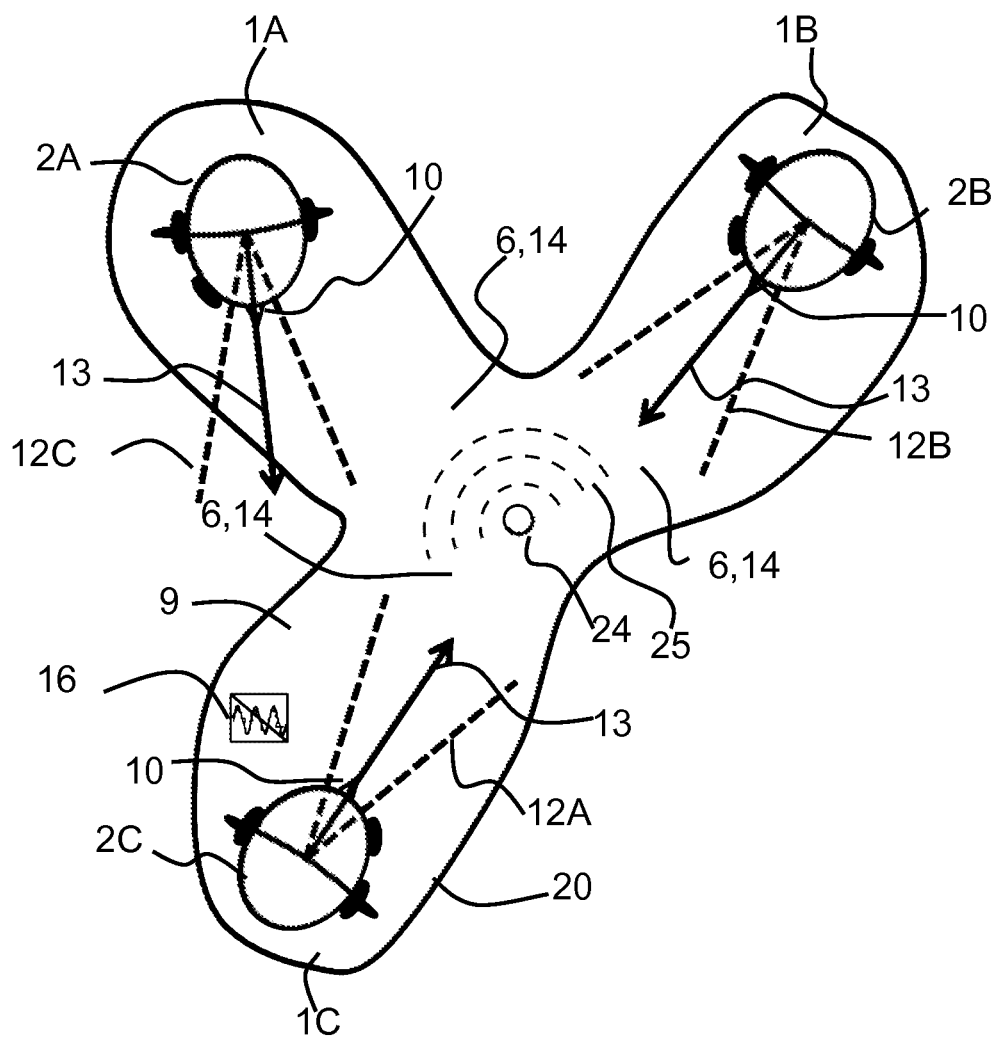
FIG. 5 illustrates an exemplary audio communication system wherein a common communication system comprises an open communication channel between three audio communication systems, at least one audio source and at least one noise cancellation filter.

FIG. 5 illustrates an exemplary audio communication system 1 wherein at least a first user 2A wearing an audio communication system 1 activates the opening handle 14 and establishing an open communication channel 6 between at least three audio communication systems (1A, 1B, 1C) worn by respective users (2A, 2B, 2C). When effectuating the opening handle 14 a common communication zone 20 is formed comprising an acoustic scene 9 including the voice sound 10 from the at least three users (2A, 2B, 2C), a predetermined audio signal 25 configured to an audio source 24, and a noise cancellation filter 16.

In this particular example a group of audio communication systems (1A, 1B, 1C) are configured to a respective field of view 12. One at the time the first user 2A orients a first field of view 12 towards plurality of other uses (2B, 2C), and the opening handle 14 is effectuated and an open communication channel 6 is established between the three audio communication systems (1A, 1B, 1C). The opening handle 14 is effectuated and a common communication zone 20 is formed comprising an acoustic scene 9 including the voice sound of the three users (2A, 2B, 2C), the predetermined audio source 24 and the noise cancellation filter 16.

The at least one audio communication system (1A) is configured to render the acoustic scene (9) encompassing each and everyone of the audio communications systems (1A and 1B) in the least one common communication zone (20).

In an example, three users (2A, 2B, 2C), each wearing an audio communication system (1A, 1B, 1C), are placed in a work area comprising heavy machinery sounding a deafening sound, which makes it impossible otherwise for the three users (2A, 2B, 2C) to communicate by talk. The three users (2A, 2B, 2C) have oriented 13 their respective field of view (12A, 12B, 12C) towards each other and an opening handle 14 is effectuated. The effectuated opening handle establishes an open communication channel 6 between the three users (2A, 2B, 2C) and also establishing a common communication zone 20. The communication zone 20 comprises an acoustic scene 9 including the voices of the three users (2A, 2B, 2C) and an audio signal 25 configured to a predetermined audio source 24. The audio source could be a fire alarm which must be heard by at least the three users (2A, 2B, 2C) in any situations.

Thus, the acoustic scene 9 in the common communication zone 20 comprises the voice 10 from the three users (2A, 2B, 2C) and an audio source 24 representing a fire alarm and a noise cancellation filter 16 eliminating any kind of noise source 21 entering the acoustic scene 9. Furthermore, the audio communication system 1 may be configured to overlay at least one audio signal 25 from the audio source 24. Thereby, the three users (2A, 2B, 2C) are able to communicate undisturbed with each other and still being able to hear the fire alarm (i.e. a siren signal) if effectuated.

The audio source may be, such as a radio, an alert signal, a phone or an instructor speaker, FIG. 6 illustrates an exemplary audio communication system 1, where a first user 2A and a second user 2B are equipped with a first audio communication system 1A and a second audio communication system 1B, respectively, and a first communication zone 3A and a second communication zone 3B, respectively. A first field of view 12A of the first audio communication system 1A and a second field of view 12B of the second audio communication system 1B are each defined by an opening distance radius $R_F$ and a field of view angle span $\alpha_f$.

In this particular example, the respective opening distance radius $R_F$ and the respective field of view angle span $\alpha_f$ for the plurality of users (2A, 2B) are the same. Alternatively, the respective opening distance radius $R_F$ and the respective field of view angle span $\alpha_f$ for the plurality of users (2A, 2B) may not be the same.

The opening distance radius $R_F$ is defined as being the radius having its origin configured to the central point of the user's head, also denoted as being the current position 26 of a user. The opening distance radius $R_f$ may be defined within a range, such as 1 m to 500 m, 1 m to 250 m, 1 m to 100 m, 1 m to 50 m, 10 m 100 m and 1 m to 10 m.

The field of view angle span $\alpha_f$ may be defined as the opening distance radius $R_F$, wherein the field of view angle span may be defined within a range, such as +/−1° to +/−5°, +/−1° to +/−10°, +/−1° to +/−20°, +/−1° to +/−30°, +/−1° to +/−40°, +/−1° to +/−50°, +/−1° to +/−60°, +/−1° to +/−70°, +/−1° to +/−80°, +/−1° to +/−90°, and +/−5° to +/−25°.

Figure 6A:
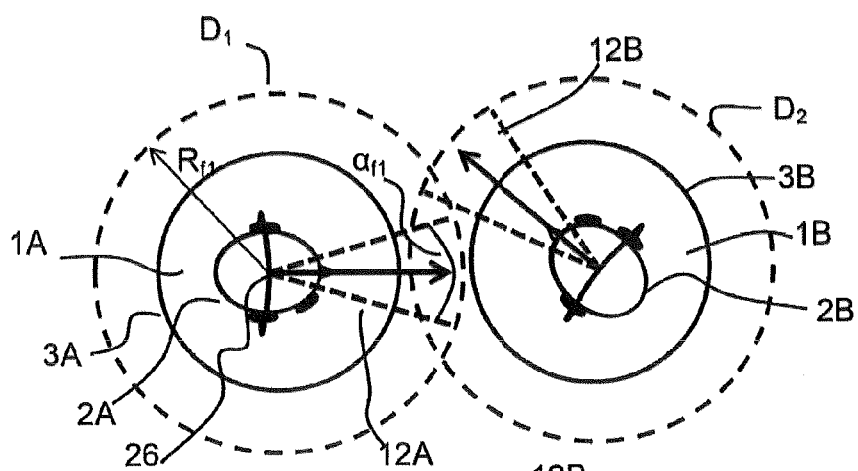
FIGS. 6A-6D illustrate an exemplary audio communication system wherein an audio communication system and another audio communication system are establishing an open communication channel by overlapping the respective field of views of the two audio communication systems.

FIG. 6A illustrates the audio communication system 1, wherein the first field of view 12A and the second field of view 12B is not overlapping, and thereby, no open communication channel is established.

Figure 6B:
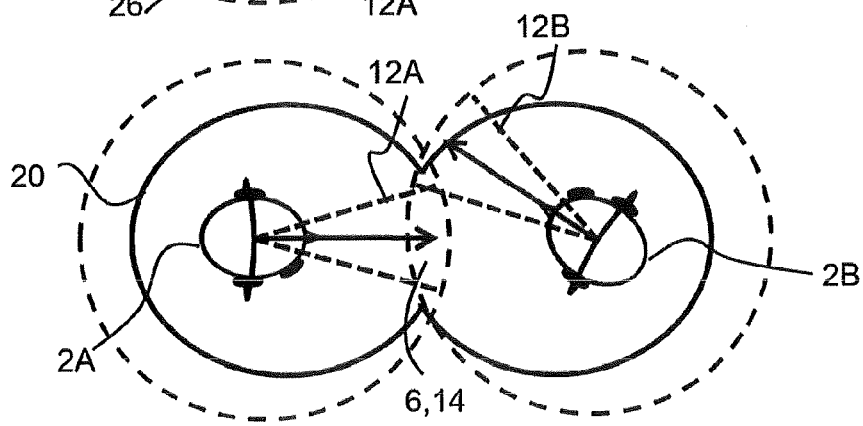

FIG. 6B illustrates the audio communication system 1, wherein the first field of view 12A is at least partially overlapping the second field of view, and the opening handle has been effectuated. The effectuated opening handle leads to an establishment of an open communication channel 6 between the two audio communication systems (1A, 1B), and thereby, forming a common communication zone 20 by merging the first communication zone 3A and the second communication zone 3B.

Figure 6C:
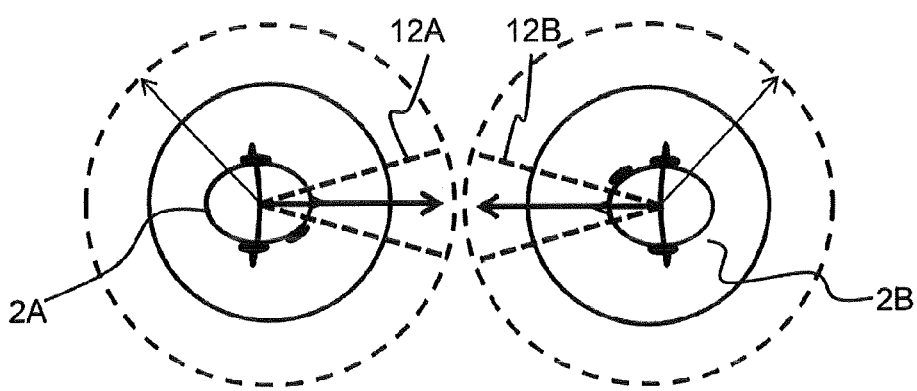

FIG. 6C illustrates the audio communication system 1, wherein the first field of view 12A oriented towards the second field of view 12B, are not overlapping each other. The opening handle is not effectuated.

In another embodiment, the opening handle may be effectuated when the first opening distance D1 of the first audio communication system 1A is within the second opening distance D2 of the second audio communication system 1B or the second communication zone 3B, and vice versa.

Figure 6D:
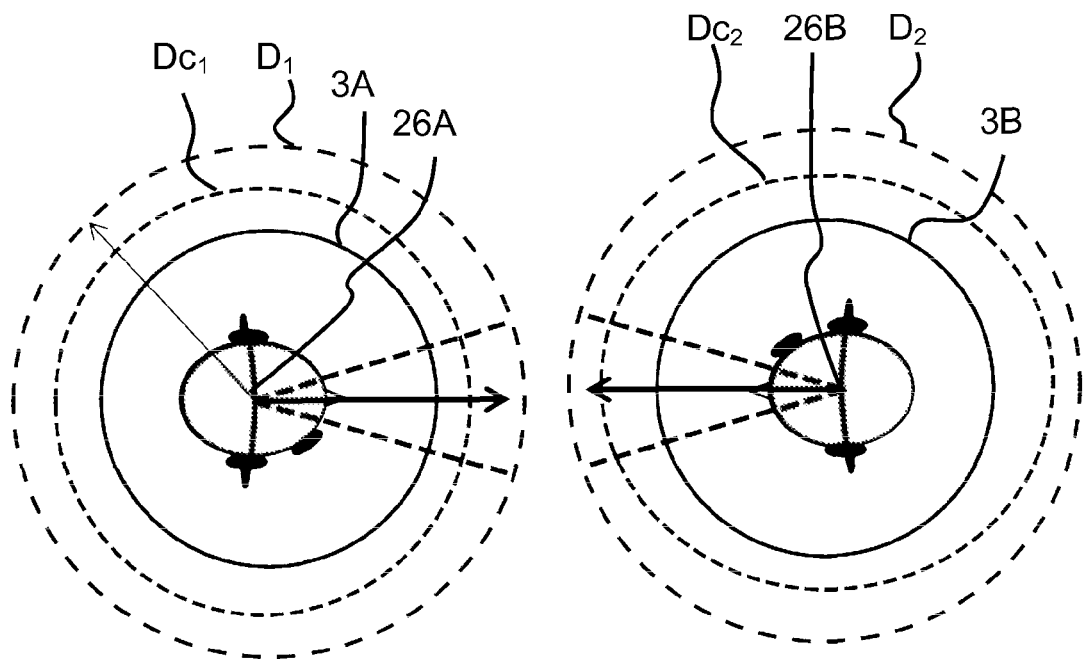

FIG. 6D illustrates the audio communication system 1, wherein the first and the second user is configured to a first closing distance $D_{c1}$ and a second closing distance $D_{c2}$, respectively.

A closing distance $D_c$ may be denoted as a closing distance radius $R_C$ which is defined in the same way as the opening distance radius. The closing distance radius $R_C$ may be defined within a range, such as $0.5 \times R_F$ to $R_F$, $0.002 \times R_F$ to $0.05 \times R_F$, $0.002 \times R_F$ to $0.95 \times R_F$ and $0.1 \times R_F$ to $0.5\ R_F$.

If the current position of the second user is outside the closing distance and/or outside the opening distance of the first user the closing handle is effectuated.

FIG. 7 illustrates an exemplary audio communication system 1 wherein a first user 2A configured to a first audio communication system 1A may be in an "available mode", "busy mode" or "on hold mode". A second user 2B configured to a second audio communication system 1B may have oriented a second field of view 12B towards the first user 2A. The activation of an opening handle 14 is depending on the mode of the first audio communication system 1A and the second field of view 12B.

Figures 7A, 7B, 7C:
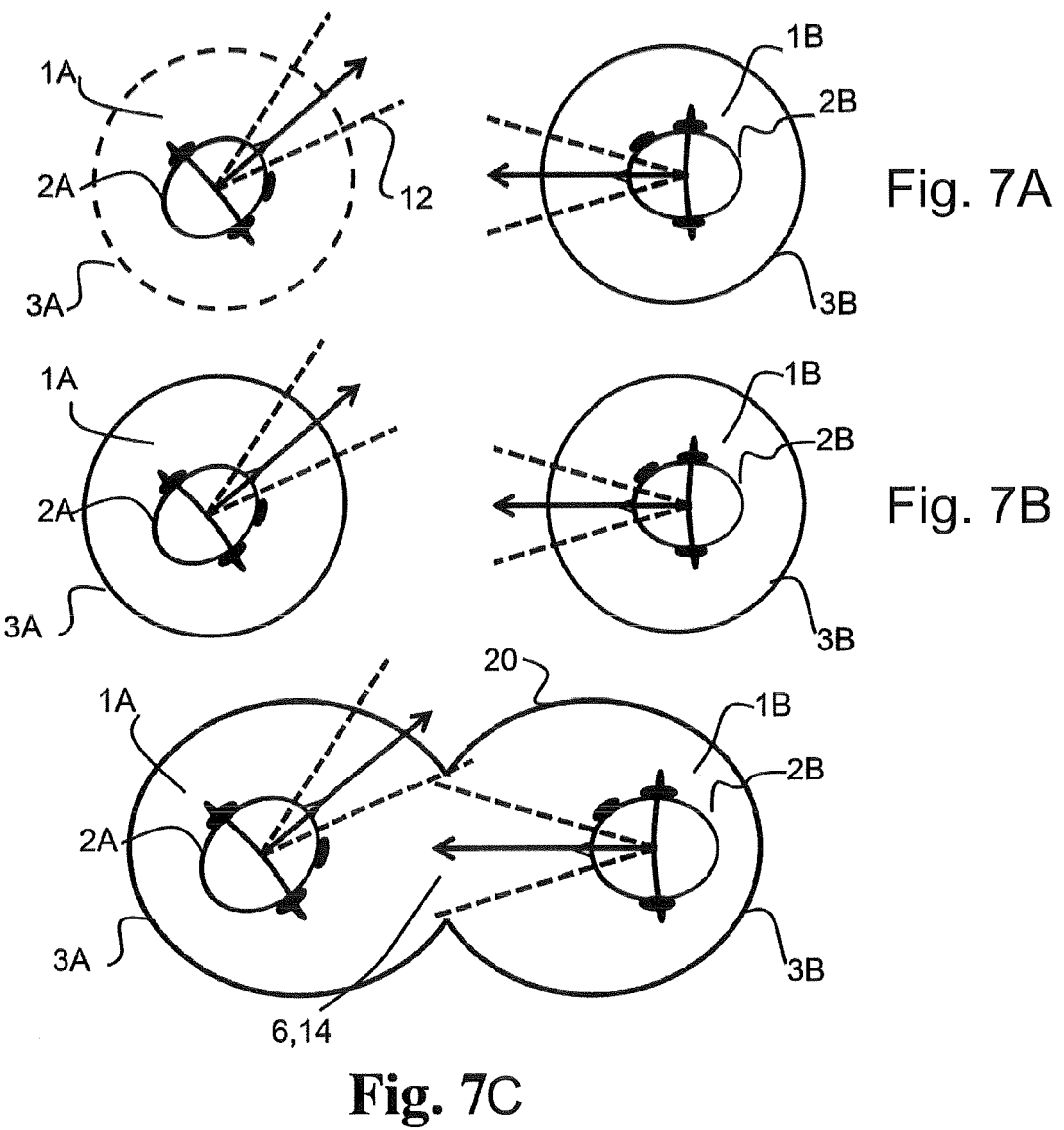
FIGS. 7A-7C illustrate an exemplary audio communication system wherein an audio communication system may be in different kind of modes.

FIG. 7A illustrates an exemplary audio communication system 1 wherein the first user 2A is looking away from the second user 2B. The first user 2A is in a "busy mode" indicating that the first user 2A is not interested in joining a common communication zone 20, and thereby, the opening handle cannot be effectuated.

FIG. 7B illustrates an exemplary audio communication system 1 wherein the first user 2A is looking away from the second user 2B, and the first user 2A is in an "available mode", indicating that the first user 2A is interested in joining a common communication zone 20, and thereby, the opening handle 14 can be effectuated.

FIG. 7C illustrates an exemplary audio communication system 1 wherein the first user 2A is looking away from the second user 2B although an open communication channel has been established. The first user 2A is configured to an "on hold mode", indicating that the voice 10 from the second user 2B has been muted and an audio signal 25 is playing on top of the voice 10. The audio signal 25 could be a phone call an alarm etc.

Alternatively the opening handle 14 may be effectuated when the first audio communication system 1A is approaching the second audio communication system 1B, a communications zone (3) or a common communication zone (20).

Alternatively, the first field of view 12A of at least the first user 2A is oriented 13 towards at least the second user 2B and the user 2B is placed within an opening distance radius $R_F$, having a radius of 1 to 10 meters, 10 to 20 meters and 1 to 5 meters, the opening handle 14 is effectuated and an open communication channel 6 is established between the two audio communication systems (1A, 1B). Furthermore, a common communication zone 20 is formed comprising an acoustic scene 9 including voice 10 of the at least two users (2A, 2B)

FIG. 8 illustrates an exemplary audio communication system 1 wherein first user 2A is equipped with a first audio communication system 1A, a second user 2B is configured to a second audio communication system 1B and a third user 2C is equipped with a third audio communication system 1C.

Figure 8A:
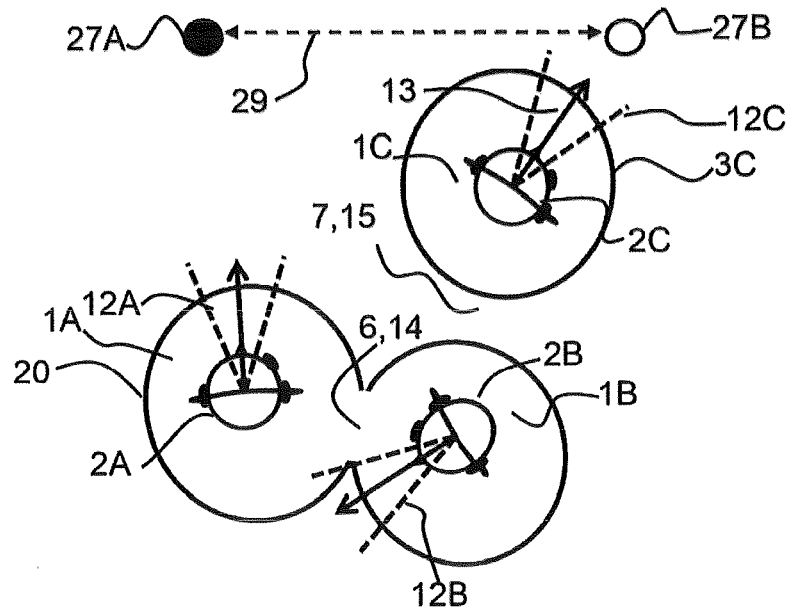
FIGS. 8A-8B illustrate an exemplary audio communication system wherein an audio communication system may connect or disconnect from a common communication zone by orienting the field of view towards a Point-Of-Interest having a predefined feature.

FIG. 8A the first and second user (2A, 2B) have oriented their respective field of view (12A; 12B) towards a first predefined point-of-interest (POI) 27A configured to effectuate an opening handle 14. The third user 2C has oriented 13 the third field of view 12C towards a second predefined POI 27B configured to effectuate a closing handle 15.

In another embodiment the third user 2C has changed the orientation, effectuating the closing handle 15.

Figure 8B:
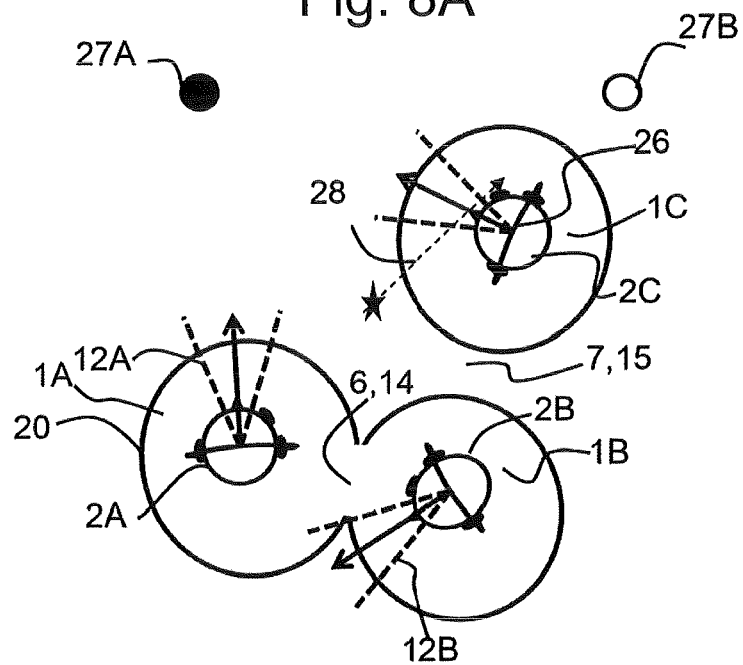

FIG. 8B the first and second user (2A, 2B) have oriented their respective field of view (12A; 12B) towards a first predefined point-of-interest (POI) 27A configured to effectuated an opening handle 14 establishing an open communication channel 6 and a common communication zone 20. The third user 2C has oriented 13 the third field of view 12C towards the first predefined POI 27A. Thus, the third user 2C has effectuated the closing handle 15 disconnecting the third audio communication system 1C from the common communication zone 20 by changing a third current position 26C according to a changed current position 28.

Thereby, the closing handle may be effectuated as a function of at least the current position (26), changed current position (28), orientation (13) or changed orientation (29).

Figure 9A:
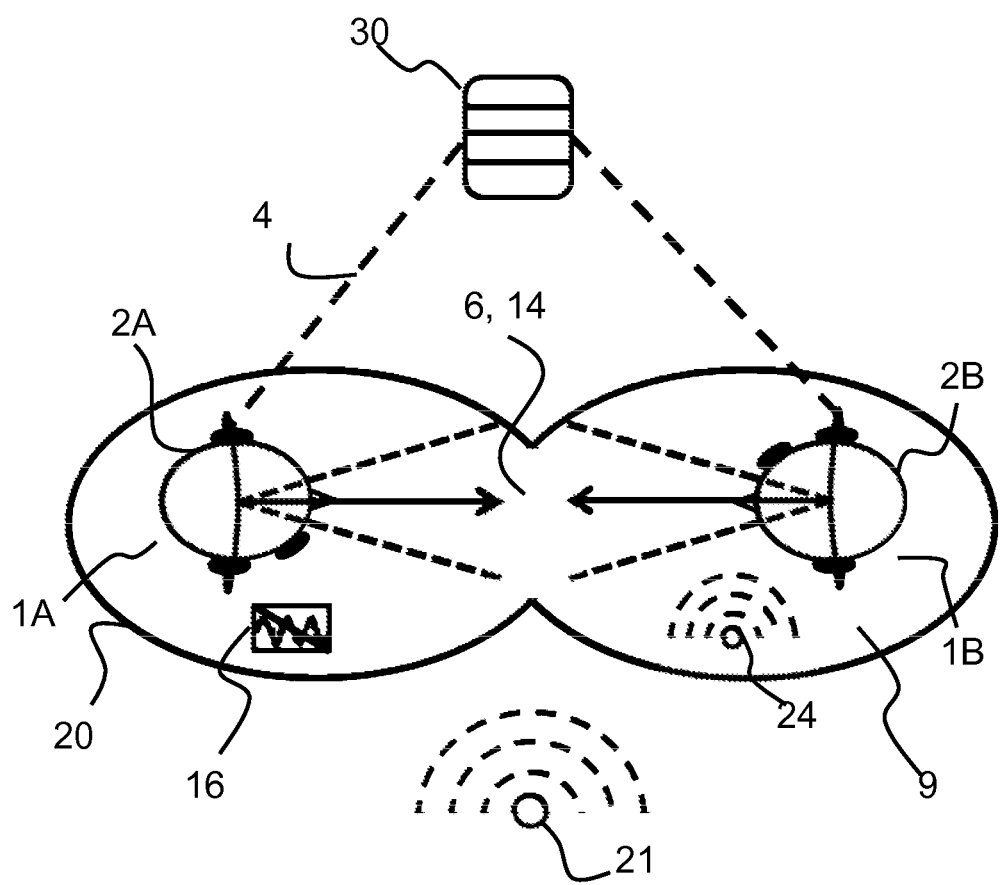
FIGS. 9A-9B illustrate an exemplary audio communication system wherein an audio communication system and at least one another audio communication system being in a common communication zone communicating via a shared server.

FIG. 9A illustrates an exemplary audio communication system 1 wherein a first and a second user (2A, 2B) are equipped with a first (1A) and a second (1B) audio communication, respectively. An open communication channel and a common communication zone 20 have been established, wherein an acoustic scene 9 of the common communication zone 20 comprises voices from the two users (2A, 2B), a predetermined audio source 24 and a noise cancellation filter 16. The communication between the first 1A and the second 1B audio communication systems is performed via a shared server 30. Furthermore, the rendering of the acoustic scene 9 is performed on the shared server 30.

Figure 9B:
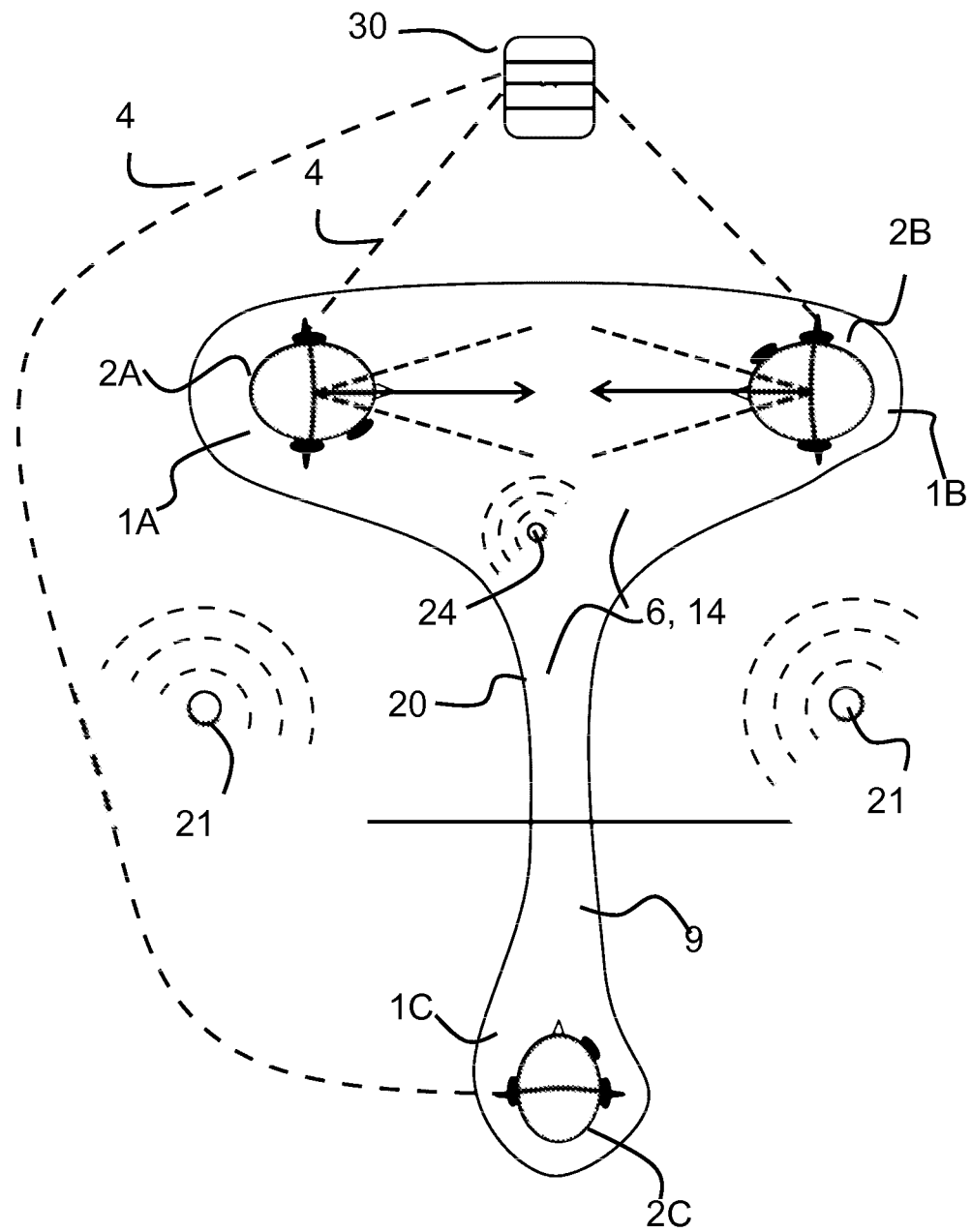

FIG. 9B illustrates an exemplary audio communication system 1 wherein a first and a second user (2A, 2B) are equipped with a first (1A) and a second (1B) audio communication, respectively. An open communication channel 6 and a common communication zone 20 have been established, wherein an acoustic scene 9 of the common communication zone 20 comprises voices from the two users (2A, 2B), a predetermined audio source 24 and a noise cancellation filter 16. Additionally, a third user 2C equipped with a third audio communication system 1C communicates distantly to the first user 2A via a shared server. If the first user 2A accepts the communication from the third user 2C, the third user 2C becomes a member of the common communication zone 20. The users (2A, 2B, 2C) are able to communicate by the audio communication systems (1A, 1B, 1C) even though the third user 1C is positioned far away, such as in a different building, a different region, country and etc.

Figure 10:
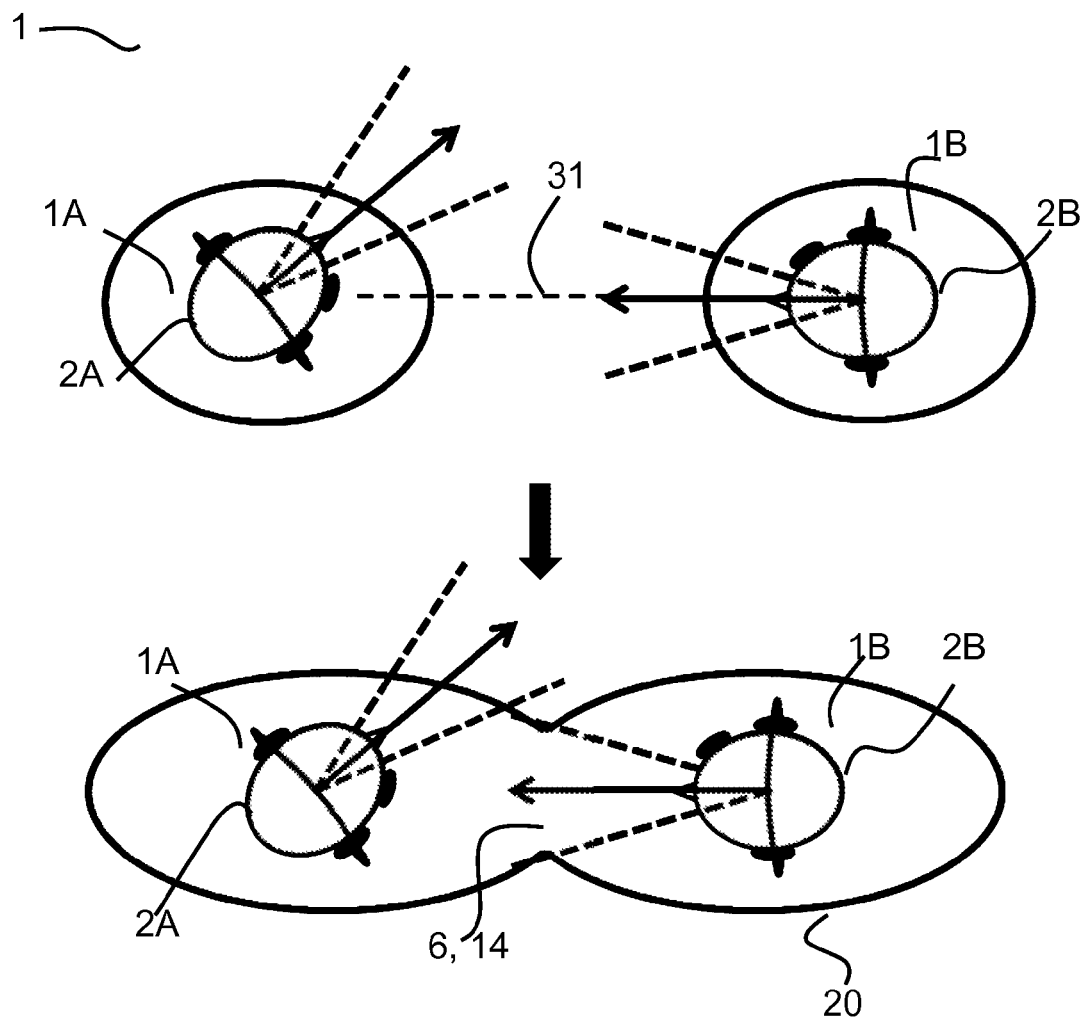
FIG. 10 illustrates an exemplary audio communication system wherein an audio communication system is transmitting a recognition signal to another communication system.

FIG. 10 illustrates an exemplary audio communication system 1 wherein a first and a second user (2A, 2B) are configured to a first 1A and a second 1B audio communication, respectively. The second user 2B may transmit via the second audio communication system 1B a recognition signal 31 to the first audio communication system 1A, wherein the recognition signal 31 indicating towards the first user 2A that the second user 2A wants to communicate with the first user 2A. In this particular example, the first user 2A accepts the recognition signal 31 via the first audio communication system 1A and an opening handle 14 is effectuated leading to an open communication channel and an established common communication zone 20.

Figure 11A:
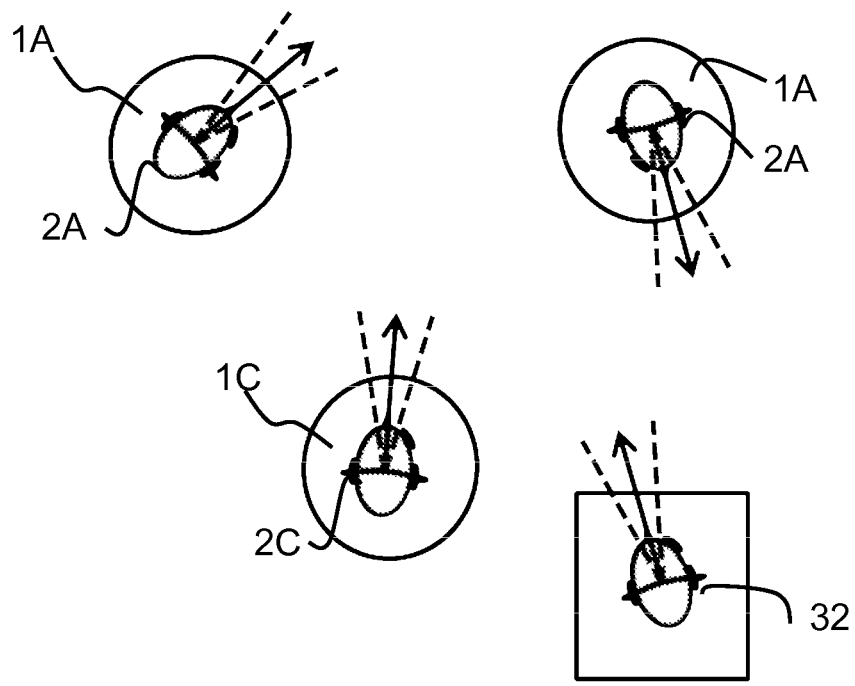
FIGS. 11A-11B illustrate an exemplary audio communication system wherein a master and slave communication has been processed into the way plurality of communication systems are communicating.

FIG. 11A illustrates an exemplary audio communication system 1 wherein a group of users (2A, 2B, 2C) equipped with each audio communication system (1A, 1B, 1C) and a master user 32 equipped with an audio communication system 1.

Figure 11B:
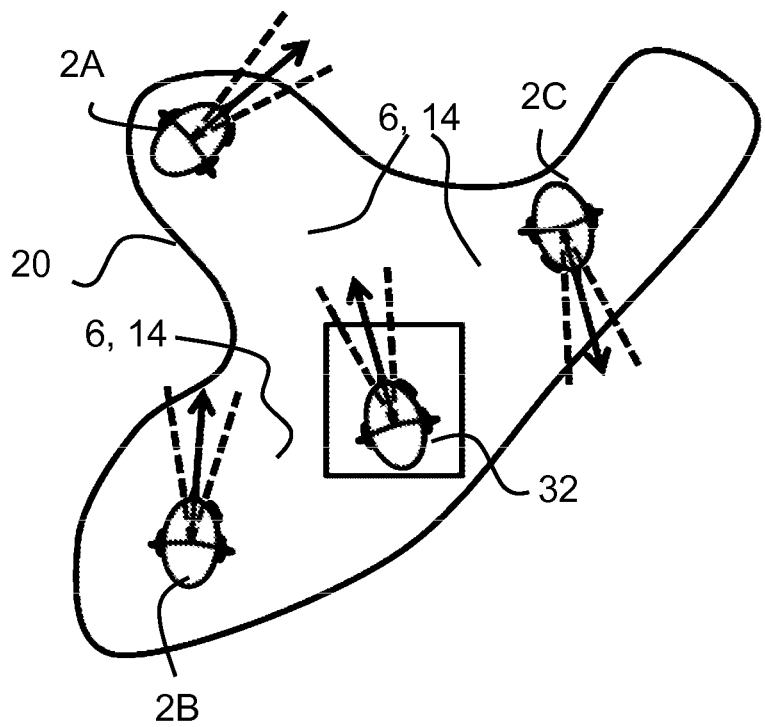

FIG. 11B illustrates the exemplary audio communication system 1 wherein the master user 32 activates an opening handle 14 establishing a common communication zone 20 with an acoustic scene 9 comprising the voices 10 from the group of users (2A, 2B, 2C) and the master user 32.

FIG. 12 illustrates an exemplary audio communication system 1 wherein a first, a second user and a third user (2A, 2B, 2C) are equipped with a first 1A, a second 1B and a third 1C audio communication system, respectively.

Figure 12A:
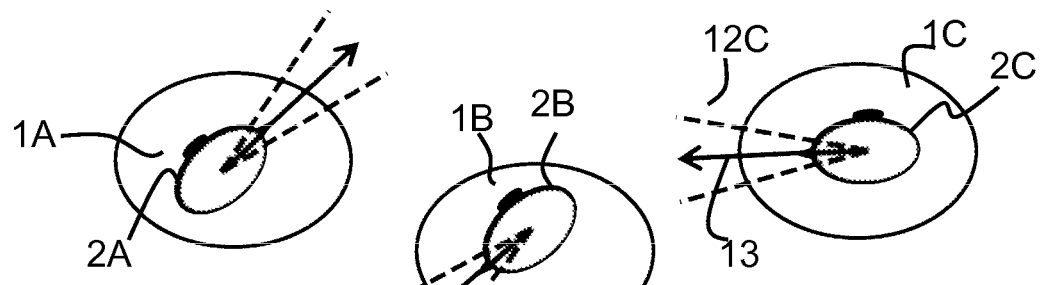
FIGS. 12A-12C illustrate an exemplary audio communication system wherein a user of an audio communication system is able to select between more than one other audio communication systems.

FIG. 12A illustrates the exemplary audio communication system 1 wherein the third field of view 12C of the third user 2C is oriented 13 in a way that the first user 2A and the second user 2B are standing within the third field of view 12C.

Figure 12B:
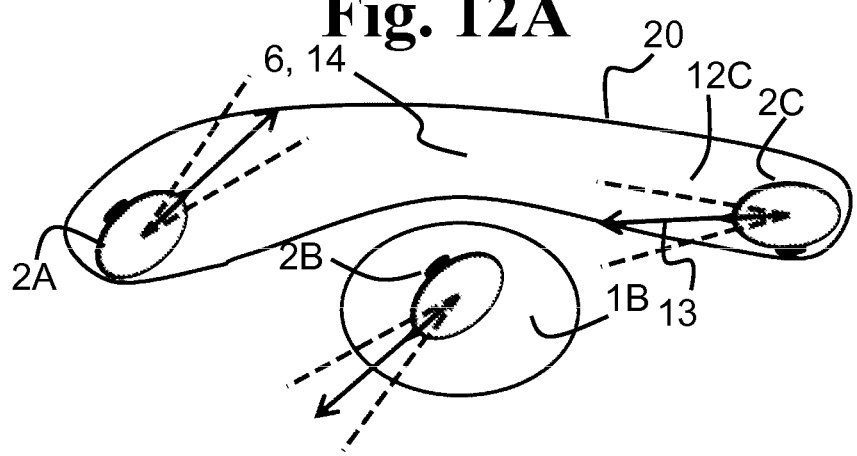

FIG. 12B illustrates the exemplary audio communication system 1 wherein the third user 2C activates an opening handle 14. The third audio communication system 1C is configured to info the third user 2C a list of other available audio communication system(s) 1X. In this particular example, the other available audio communication systems are the first 1A and the second 1B audio communication system. The third user 2C has the possibility of selecting one or more of the other available audio communication systems (1A, 1B).

In this particular example the third user 2C has chosen the first user 2A, and thereby, an open communication channel 6 has been established forming a common communication zone 20 comprising the first 1A and the third 1C audio communication system.

Figure 12C:
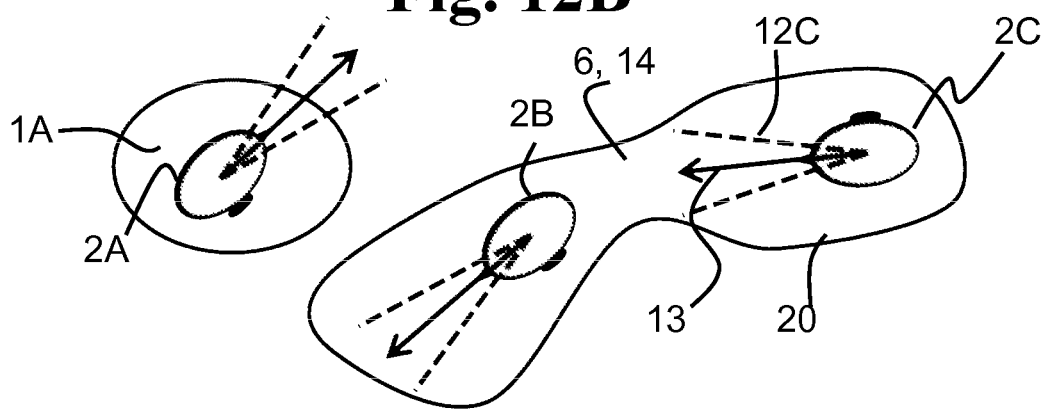

FIG. 12C illustrates the exemplary audio communication system 1 wherein in this particular example the third user 2C has chosen the second user 2B. An open communication channel 6 has been established within a common communication zone 20 comprising the second 1B and the third 1C audio communication system.

Although particular embodiments have been shown and described, it will be understood that they are not intended to limit the claimed inventions, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

EXAMPLES

An example of an embodiment, an opening handle 14 may be effectuated by a series of events, where a first step could be that a first user equipped with an audio communication system 1 has oriented 13 a field of view 12 towards a point of interest 27. A second step, a timer is set and counting when the first user 2A has fixed the orientation of the field of view 12 towards the point of interest 27 in a predetermined time interval, such as 1 to 10 seconds. A third step, if the counter has reached the maximum count value the opening handle 14 is effectuated. If the user has moved the field of view 12 away from the point of interest 27, such that the point of interest 27 is not being captured by the field of view 12, the counter stops and reset to a predetermined value, such as zero seconds.

Additionally, a closing handle 15 may be effectuated when the at least first user 2A has oriented 13 the field of view 12 towards a different or same point of interest 27. The orientation 13 may be fixed within a time interval, such as 1 to 10 second, before effectuating the closing handle.

An example of an alternatively embodiment, an opening handle 14 may be effectuated by a series of events, where a first step could be that a first user 2A equipped with an audio communication system 1 has oriented 13 a field of view 12 towards a point of interest 27. A second step, a button or any kind of a tangible means. A third step, the opening handle 14 is effectuated.

Furthermore, a closing handle may be effectuated when the at least first user 2A may press a closing button or any kind of a tangible means.

An example of an embodiment, an opening handle 14 may be effectuated by a series of events, where a first step could be that a first user 2A equipped with an audio communication system 1 has oriented 13 a field of view 12 towards a point of interest 27. A second step, the first user 2A may transmit a voice command through a microphone 11 and to the shared server. A third step, the shared server registers the voice command and by a voice recognition unit, implemented in the shared server, may effectuate the opening handle 14. The voice command could be a sentence or just a word, such as "Open handle", "Open", "Ohandle" etc.

Additionally, a closing handle may be effectuated when the at least first user 2A may transmit a voice command through a microphone 11 and to the shared server. The shared server may register the voice command and by a voice recognition unit, the closing handle 15 may be effectuated. The voice command could be a sentence or just a word, such as "Close handle", "Close", "Chandle" etc.

An example of an embodiment, an opening handle 14 may be effectuated by a series of events, where a first step could be that a first user 2A equipped with a first audio communication system 1A has oriented 13 a first field of view 12A towards a second user 2B equipped with a second audio communication system 1B and vice versa. A second step, a shared server receives the respective position and orientation of the at least two users (2A, 2B). A third step, the shared server register an overlap between the first field of view 12A and the second field of view 12B and the opening handle 14 is effectuated.

Additionally, a closing handle may be effectuated when the at least first user 2A moves the orientation of the first field of view 12 away from the second field of view 12B, and thereby, no overlap occurs between the two fields of view (12A, 12B).

An example of an embodiment, an opening handle 14 may be effectuated by a series of events, where a first step could be that a first user 2A equipped with a first audio communication system 1A has oriented 13 a first field of view 12A towards a second user 2B equipped with a second audio communication system 1B. A second step, the first user may activate a button or any kind of a tangible means. A third step, the shared server register an activation of the button or another tangible means and the opening handle 14 is effectuated.

An example of an embodiment, an opening handle 14 may be effectuated by a series of events, where a first step could be that a first user 2A equipped with a first audio communication system 1A has oriented 13 a first field of view 12A towards a second user 2B equipped with a second audio communication system 1B. A second step, the shared server has registered the orientation 13 and current position 26A of the first user 2A and a second current position 26B of the second user 2B. A timer is set and counting when the first user 2A has fixed the orientation 13 of the first field of view 12A towards the second user 2B in a predetermined time interval, such as 1 to 10 seconds. A third step, if the counter has reached the maximum count value the opening handle 14 is effectuated. If the user has moved the first field of view 12A away from the second user 2B, such that the second user 2B is not being captured by the first field of view 12A, the counter stops and reset to a predetermined value, such as zero seconds.

An example of an embodiment, an opening handle 14 may be effectuated by a series of events, where a first step could be that a shared server may receives the position and orientation of a first user 2A equipped with a first audio communication system 1A. Second step, the shared server comprises an artificially intelligent unit receiving the position and the orientation of the first user 2A. The artificially intelligent unit may estimate a walking/running pattern, a speed, and a surrounding environment of the at least first user 2A. Third step, the artificially intelligent unit predicts that the opening handle may be effectuated. E.g. the artificially intelligent unit may predict that the first user is moving towards a second user 2B, although the first user and/or second user is moving in random directions. When the second user is within a first opening distance configured to the first user 2A, the opening handle is effectuated.

The invention claimed is:

1. An audio communication system configured to be head worn by a user and with at least one communication zone configured to communicate with the at least one other audio communication system through a communications channel that can be open or closed, the audio communication system comprising
at least one audio unit configured to sound an acoustic scene to a user (2) using the audio communication system and which acoustic scene is enabled for inclusion of at least one voice from at least one another audio communication system;
at least one microphone configured to receive a voice from a user using the audio communication system;
a field of view in the direction of orientation of the audio communications system;
which audio communication system is configured to establish an open communication channel when a predetermined opening handle is effectuated as a function of the field of view and to connect the one communication zone with at least one other communication zone of another audio communication system for establishing a common communication zone for communication between the least two audio communication systems via an open communication channel and which audio communication system is configured to remain connected to said least one common communication zone until a predetermined closing handle is effectuated to disconnect from the least one common communication zone.

2. An audio communications system according to claim 1 wherein the audio communications system has an acoustic renderer configured to acoustically render an acoustic scene; which acoustic scene rendered preferably is a function of a head related transfer function.

3. An audio communications system according to claim 2 wherein the rendering of an acoustic scene is performed on a shared server.

4. An audio communications system according to claim 1 wherein the audio communication system is configured to render an acoustic scene encompassing each and everyone of the audio communications systems in the least one common communication zone.

5. An audio communications system according to claim 1 wherein the audio communications system is configured to overlay at least one audio signal from an audio source such as a radio, an alert signal, a phone, an instructor speaker.

6. An audio communications system according to claim 5 wherein the audio communication system is configured to render an acoustic scene as a function of the current position and/or orientation of the audio communication system and/or as a function of the current position and/or orientation of at least one other audio communication system.

7. An audio communications system according to claim 1 wherein the audio communication system comprises a position unit configured to estimate a current position of the audio communication system.

8. An audio communications system according to claim 7, wherein the closing handle is effectuated as a function of at least the current position, changed current position, orientation or changed orientation.

9. An audio communications system according to claim 1 wherein the audio communication system comprises an orientation unit configured for estimating a current orientation of the audio communication system; and when the user handles the audio communications system in its intended operational position.

10. An audio communication system according to claim 1 wherein the opening handle is effectuated when a first field of view of a first audio communication system is at least partially overlapping a second field of view of a second communications system when the fields of views are oriented essentially towards one and another.

11. An audio communications system according to claim 1 wherein the opening handle is effectuated when a first opening distance ($D_1$) of a first audio communication system is within a second opening distance ($D_2$) of a second audio communication system, a communications zone or a common communication zone.

12. An audio communications system according to claim 1 wherein the opening handle is effectuated when the first audio communication system is approaching a second audio communication system, a communications zone or a common communication zone.

13. An audio communications system according to claim 1 wherein the opening handle is effectuated when the audio communication system is oriented towards a predefined location or Point-of-interest predefined to connect to a common communication zone.

14. An audio communications system according to claim 1 wherein the closing handle is effectuated when the audio communication system is oriented towards a predefined location or Point-of-Interest to disconnect from a common communication zone.

15. An audio communications system according to claim 1 wherein the communications amongst plurality of audio communication systems is performed via a shared server.

16. An audio communications system according to claim 1 wherein the audio communication system is configured with a noise cancellation system to make an essentially noise free communication zone or common communication zone.

17. An audio communications system according to claim 1 wherein the audio communication system is configured with means for at least temporally to exclude activation of the opening handle.

18. An audio communications system according to claim 1 wherein the opening handle is effectuated to connect the one communication zone with another acoustic scene for establishing a common communication zone for communication via an open communication channel and which audio communication system is configured to remain connected to said least one common communication zone until a predetermined closing handle is effectuated to disconnect from the least one common communication zone.

* * * * *